US012675900B2

(12) United States Patent
Shao et al.

(10) Patent No.: US 12,675,900 B2
(45) Date of Patent: Jul. 7, 2026

(54) POSITIONING METHOD, POSITIONING DEVICE, POSITIONING APPARATUS AND COMPUTER STORAGE MEDIUM

(71) Applicant: BOE TECHNOLOGY GROUP CO., LTD., Beijing (CN)

(72) Inventors: Lei Shao, Beijing (CN); Li Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 343 days.

(21) Appl. No.: 18/291,639

(22) PCT Filed: Jan. 31, 2023

(86) PCT No.: PCT/CN2023/073961
§ 371 (c)(1),
(2) Date: Jan. 24, 2024

(87) PCT Pub. No.: WO2024/159396
PCT Pub. Date: Aug. 8, 2024

(65) Prior Publication Data
US 2025/0086825 A1     Mar. 13, 2025

(51) Int. Cl.
*G06T 7/73* (2017.01)
*G06T 11/26* (2026.01)

(52) U.S. Cl.
CPC ............... *G06T 7/73* (2017.01); *G06T 11/26* (2026.01)

(58) Field of Classification Search
USPC ......................................................... 382/103
See application file for complete search history.

(56) References Cited

U.S. PATENT DOCUMENTS

2021/0124914 A1* 4/2021 Lin ........................... G06N 3/04

FOREIGN PATENT DOCUMENTS

| CN | 108846348 | A | 11/2018 |
|----|-----------|---|---------|
| CN | 110210323 | A | 9/2019 |
| CN | 112131985 | A | 12/2020 |
| CN | 112200157 | A | 1/2021 |
| CN | 112287865 | A | 1/2021 |
| CN | 114036969 | A | 2/2022 |

(Continued)

OTHER PUBLICATIONS

Zhang et al., "Correction method for moving target location with mobile nodes," Application Research of Computers, Dec. 2009, vol. 126, No. 112, pp. 1-4.

*Primary Examiner* — Jacky X Zheng
(74) *Attorney, Agent, or Firm* — HOUTTEMAN LAW LLC

(57) ABSTRACT

The embodiment of the present disclosure provides a positioning method, a positioning device, positioning apparatus and a computer storage medium. The positioning method includes: acquiring an image to be processed, wherein the image to be processed includes a target object; detecting a plurality of key points on a target object to determine first coordinates of the key points of the target object in a camera coordinate system; projecting the key points from the camera coordinate system to a geodetic coordinate system to obtain a mapping graph with each key point as a vertex; and calculating a barycentric coordinate of the mapping graph, and taking the barycentric coordinate as a geographic coordinate of the target object.

18 Claims, 6 Drawing Sheets

(56) References Cited

FOREIGN PATENT DOCUMENTS

| CN | 114067358 | A | 2/2022 | | |
|----|-----------|----|--------|-----|----------|
| EP | 2486545 | B1 | 7/2019 | | |
| WO | WO2021217906 | A1 | 11/2021 | | |
| WO | WO-2022067606 | A1 * | 4/2022 | ............ | G06F 18/00 |

\* cited by examiner

Acquiring an image to be processed,
where the image to be processed includes a target object  — S1

Detecting a plurality of key points of the target object to
determine first coordinates, in a camera coordinate system,
of the plurality of key points of the target object  — S2

Projecting the key points from the camera coordinate
system to a geodetic coordinate system to obtain a
mapping graph with each key point as a vertex  — S3

Calculating a barycentric coordinate of the mapping graph,
and serving the barycentric coordinate as a geographical
coordinate of the target object  — S4

FIG. 1a

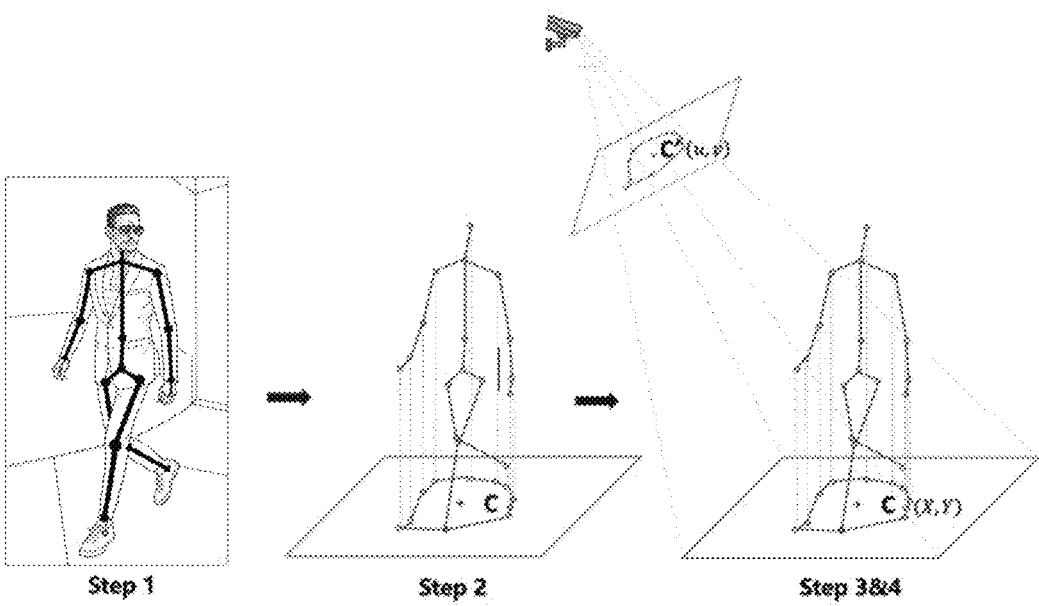

Step 1       Step 2       Step 3&4

FIG. 1b

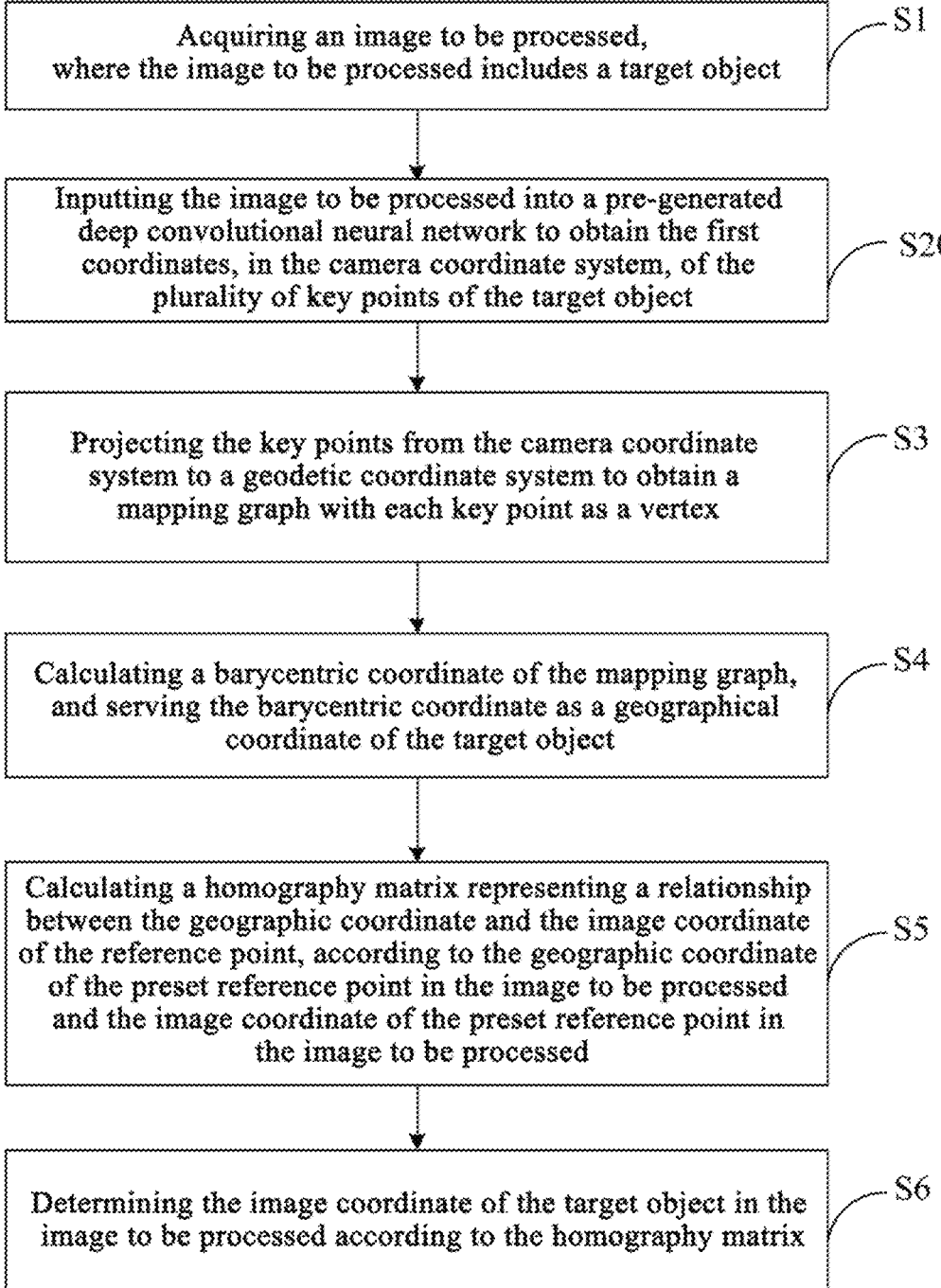

Acquiring an image to be processed, where the image to be processed includes a target object ⟋ S1

Inputting the image to be processed into a pre-generated deep convolutional neural network to obtain the first coordinates, in the camera coordinate system, of the plurality of key points of the target object ⟋ S20

Projecting the key points from the camera coordinate system to a geodetic coordinate system to obtain a mapping graph with each key point as a vertex ⟋ S3

Calculating a barycentric coordinate of the mapping graph, and serving the barycentric coordinate as a geographical coordinate of the target object ⟋ S4

Calculating a homography matrix representing a relationship between the geographic coordinate and the image coordinate of the reference point, according to the geographic coordinate of the preset reference point in the image to be processed and the image coordinate of the preset reference point in the image to be processed ⟋ S5

Determining the image coordinate of the target object in the image to be processed according to the homography matrix ⟋ S6

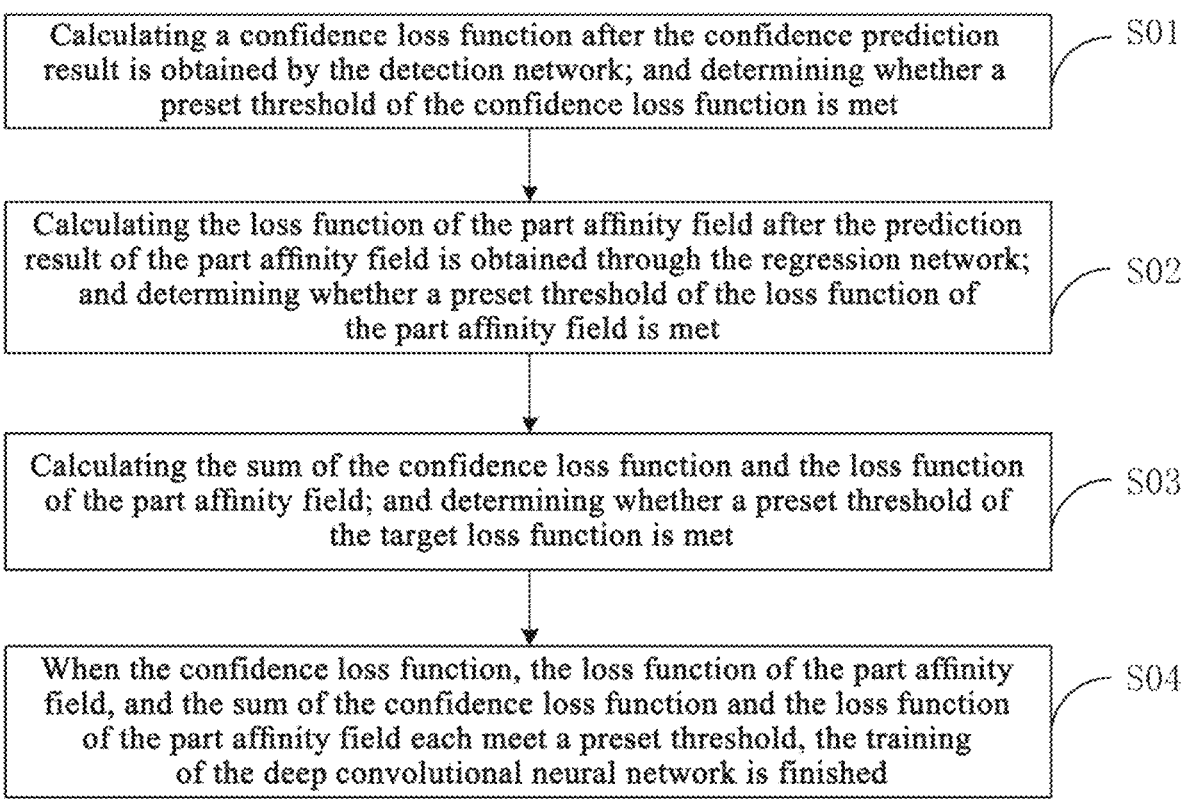

Calculating a confidence loss function after the confidence prediction result is obtained by the detection network; and determining whether a preset threshold of the confidence loss function is met ⟶ S01

Calculating the loss function of the part affinity field after the prediction result of the part affinity field is obtained through the regression network; and determining whether a preset threshold of the loss function of the part affinity field is met ⟶ S02

Calculating the sum of the confidence loss function and the loss function of the part affinity field; and determining whether a preset threshold of the target loss function is met ⟶ S03

When the confidence loss function, the loss function of the part affinity field, and the sum of the confidence loss function and the loss function of the part affinity field each meet a preset threshold, the training of the deep convolutional neural network is finished ⟶ S04

FIG. 5

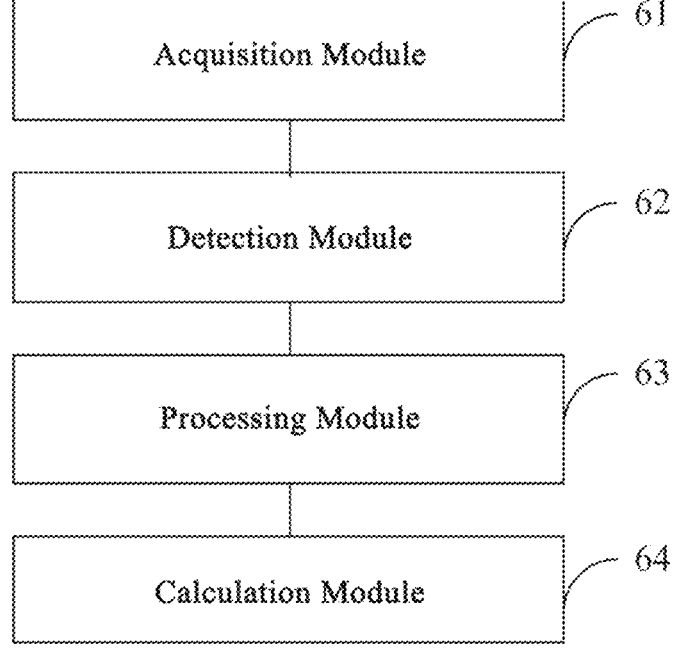

Acquisition Module ⟶ 61

Detection Module ⟶ 62

Processing Module ⟶ 63

Calculation Module ⟶ 64

FIG. 6

POSITIONING METHOD, POSITIONING DEVICE, POSITIONING APPARATUS AND COMPUTER STORAGE MEDIUM

FIELD OF THE PRESENT DISCLOSURE

The present disclosure relates to the field of display technologies, and in particular, to a positioning method, a positioning device, a positioning apparatus, and a computer storage medium.

BACKGROUND OF THE PRESENT DISCLOSURE

With the development of the Internet of Things and artificial intelligence technology, driven by the demand for consumer-level and enterprise-level applications in indoor environments, the importance of indoor location-based services in information systems is becoming increasingly prominent. As the core of indoor positioning and navigation services, real-time geographic coordinate calculation technology for indoor personnel has broad potential application value in large indoor public spaces such as supermarkets, exhibition halls, and transportation hubs.

SUMMARY OF THE PRESENT DISCLOSURE

Embodiments of the present disclosure provide a positioning method, a positioning device, a positioning apparatus, and a computer storage medium.

As a first aspect, an embodiment of the present disclosure provides a positioning method, including: acquiring an image to be processed, wherein the image to be processed comprises a target object; detecting a plurality of key points of the target object to determine first coordinates of the plurality of key points of the target object in a camera coordinate system; projecting the plurality of key points from the camera coordinate system to a geodetic coordinate system to obtain a mapping graph with each of the plurality of key points as a vertex; and calculating a barycentric coordinate of the mapping graph, and taking the barycentric coordinate as a geographic coordinate of the target object.

In some embodiments, detecting the plurality of key points of the target object to determine the first coordinates of the plurality of key points of the target object in the camera coordinate system, includes: inputting the image to be processed into a pre-trained deep convolution neural network to obtain the first coordinates, in the camera coordinate system, of the plurality of key points corresponding to the target object.

In some embodiments, the deep convolutional neural network includes a pre-processing network and a dual-branch network, and the dual-branch network includes a detection network and a regression network. Inputting the image to be processed into the pre-trained deep convolution neural network to obtain the first coordinates, in the camera coordinate system, of the plurality of key points corresponding to the target object, includes: inputting the image to be processed into the pre-processing network for feature extraction to obtain a feature map set, wherein the feature map set includes a plurality of feature maps, the feature map set includes the target object, and each of the plurality of feature maps includes at least one of the plurality of key points; inputting the feature map set into the detection network to obtain confidence prediction results of the key points; inputting the feature map set and the confidence prediction results of the key points into the regression network to obtain part affinity field prediction results of the key points; and obtaining the first coordinates of the plurality of key points according to the confidence prediction results and the part affinity field prediction results of the key points; wherein the confidence prediction result represents a predicted position of the key point, and the part affinity field prediction result represents an association relation between the predicted positions.

In some embodiments, inputting the feature map set into the detection network to obtain the confidence prediction results of the key points, includes: detecting the feature map set to determine initial coordinates of the key point in each feature map and a confidence value corresponding to each of the initial coordinates; and determining at least one of the initial coordinates with the confidence value larger than a preset threshold value as a predicted coordinate of the key point, wherein the confidence prediction result of the key point includes at least one predicted coordinate.

In some embodiments, inputting the feature map set and the confidence prediction results of the key points into the regression network to obtain the part affinity field prediction results of the key points, includes: determining a father key point corresponding to each key point according to a human skeleton structure diagram acquired in advance, wherein the father key point of a root key point is the root key point itself; for each of the plurality of feature maps, pairwise matching at least one predicted coordinate corresponding to each key point with at least one predicted coordinate corresponding to a father key point corresponding to the key point, to determine an affinity field between the two matched predicted coordinates; and connecting the two predicted coordinates with the strongest affinity fields therebetween to obtain a body part connection between the key point and the father key point corresponding to the key point; and forming a local skeleton diagram corresponding to the feature map according to all body part connections in the feature map.

In some embodiments, obtaining the first coordinates of the plurality of key points according to the confidence prediction results and the part affinity field prediction results of the key points, includes: combining and splicing the local skeleton diagrams corresponding to the feature maps according to the key points at a same position in different local skeleton diagrams, to determine a complete skeleton diagram of the target object; selecting the predicted coordinate with a higher confidence as a position of the key point in response to that the key point at the same position in different local skeleton diagrams has different predicted coordinates; and obtaining the first coordinates of the plurality of key points according to the complete skeleton diagram.

In some embodiments, prior to inputting the image to be processed into the pre-trained deep convolution neural network, the method further includes: calculating a confidence loss function after the confidence prediction result is obtained by the detection network; and determining whether a preset threshold value of the confidence loss function is met; calculating a loss function of a part affinity field after the part affinity field prediction result is obtained by the regression network; and determining whether a preset threshold value of the loss function of the part affinity field is met; calculating a sum of the confidence loss function and the loss function of the part affinity field to determine whether a preset threshold value of a target loss function is met; and finishing training of the deep convolutional neural network, in response to that the confidence loss function, the loss function of the part affinity field, and the sum of the confidence loss function and the loss function of the part affinity field all meet a preset threshold.

In some embodiments, the confidence loss function is calculated by the following formula: $E_d(\hat{h}_{i,l}, h_{i,l}) = -h_{i,l} \log(\hat{h}_{i,l}) - (1 - h_{i,l}) \log(1 - \hat{h}_{i,l})$. $\hat{h}_{i,l}$ is a predicted coordinate of the $i^{th}$ key point in the feature map l, and a value of $h_{i,l}$ is 0 or 1; in response to that the $i^{th}$ key point in the feature map l is not shielded, $h_{i,l}$ has a value of 1, otherwise 0.

In some embodiments, the loss function of the part affinity field is calculated by the following formula:

$$E_r(R_i, \hat{R}_i) = \|R_i - \hat{R}_i\|_2^2.$$

$R_i$ and $\hat{R}_i$ is a true coordinate and a predicted coordinate of the $i^{th}$ key point, respectively, and the true coordinate is pre-obtained sample data.

In some embodiments, the object includes a human body, the plurality of key points include a head, a neck, a right shoulder, a right elbow, a right wrist, a right hand, a left shoulder, a left elbow, a left wrist, a left hand, a back, a waist, a right hip, a right knee, a right ankle, a left hip, a left knee, and a left ankle.

In some embodiments, projecting the plurality of key points from the camera coordinate system to the geodetic coordinate system to obtain the mapping graph with each of the plurality of key points as the vertex, includes: mapping the first coordinates of the key points corresponding to the target object into second coordinates in the geodetic coordinate system, according to a conversion algorithm acquired in advance between the camera coordinate system and the geodetic coordinate system; and forming the mapping graph corresponding to the target object by taking each of the second coordinates as a vertex.

In some embodiments, the mapping graph is a polygon having N sides, with N being an integer greater than 3; calculating the barycentric coordinate of the mapping graph, and taking the barycentric coordinate as the geographic coordinate of the target object, includes: dividing the mapping graph into (N−2) triangles, wherein the (N−2) triangles are triangles formed by a preset vertex and (N−2) sides not adjacent to the preset vertex; calculating a barycentric coordinate and an area of each of the triangles according to the second coordinates of the key points corresponding to the target object; and determining the barycentric coordinate of the mapping graph according to the barycentric coordinate and the area of each of the triangles, and taking the barycentric coordinate as the geographic coordinate of the target object.

In some embodiments, the barycentric coordinate of the map pattern is calculated by the following formula:

$$x_g = \frac{\sum_{i=1}^{N-2} x_i \sigma_i}{\sum_{i=1}^{N-2} \sigma_i}, \quad y_g = \frac{\sum_{i=1}^{N-2} y_i \sigma_i}{\sum_{i=1}^{N-2} \sigma_i}.$$

$x_i$ and $y_i$ respectively represent horizontal and vertical coordinates of the barycentric coordinate of the $i^{th}$ triangle, and $\sigma_i$ represents an area of the $i^{th}$ triangle.

In some embodiments, the positioning method further include: calculating a homography matrix between a geographic coordinate and an image coordinate of a reference point, according to the geographic coordinate of the preset reference point in the image to be processed and the image coordinate of the preset reference point in the image to be processed; and determining an image coordinate of the target object in the image to be processed according to the homography matrix.

In some embodiments, the homography matrix between the geographic coordinate and the image coordinate of the reference point is calculated by the following formula:

$$\begin{pmatrix} u \\ v \\ 1 \end{pmatrix} = H \begin{pmatrix} X \\ Y \\ 1 \end{pmatrix}.$$

H denotes the homography matrix, u and v denote horizontal and vertical coordinates of the image coordinate, respectively, and X and Y denote horizontal and vertical coordinates of the geographical coordinate, respectively.

As a second aspect, an embodiment of the present disclosure provides a positioning device, include: an acquisition module configured to acquire an image to be processed, and the image to be processed include a target object; a detection module configured to detect a plurality of key points of the target object to determine first coordinates, in a camera coordinate system, of the plurality of key points of the target object; a processing module configured to project the plurality of key points in the camera coordinate system to a geodetic coordinate system to obtain a mapping graph with each of the key points as a vertex; and a calculation module configured to calculate a barycentric coordinate of the mapping graph, and take the barycentric coordinate as a geographic coordinate of the target object.

As a third aspect, an embodiment of the present disclosure provides a positioning apparatus, which include a processor, a memory and a bus, wherein the processor communicates with the memory through the bus, the memory storing machine-readable instructions which is configured to, when being run by the processor, cause the processor to perform the steps of the positioning method described according to the first aspect.

As a fourth aspect, an embodiment of the present disclosure provides a computer-non-transitory readable storage medium, storing a computer program which is configured to, when being run by the processor, perform the steps of the positioning method described according to the first aspect.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. In the accompanying drawings:

FIG. 1a is a schematic flowchart showing a positioning method in an embodiment of the present disclosure;

FIG. 1b is a schematic diagram showing a positioning process for the method shown in FIG. 1a;

FIG. 3 is a schematic flowchart showing another positioning method in an embodiment of the present disclosure;

FIG. 5 is a schematic flowchart showing a method for training a deep convolutional neural network in an embodiment of the present disclosure;

FIG. 6 is a schematic diagram showing a structure of a positioning device in an embodiment of the present disclosure;

DETAILED DESCRIPTION OF THE EXEMPLARY EMBODIMENTS

Figure 2:
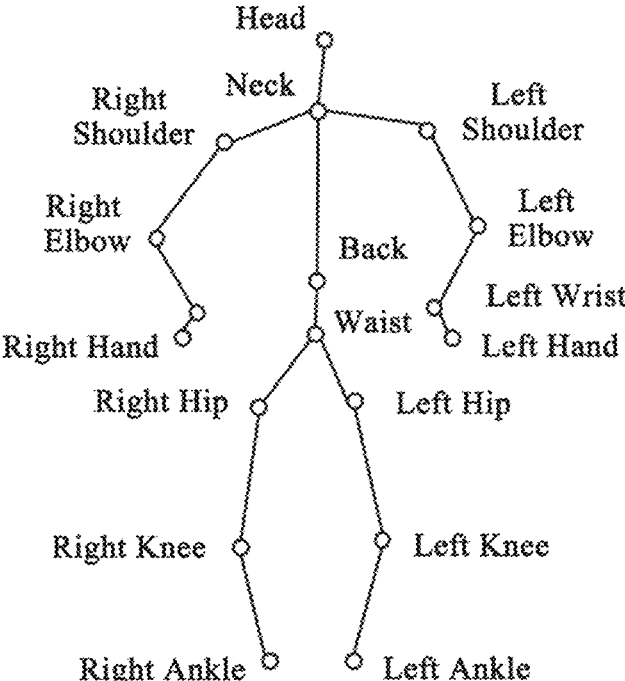
FIG. 2 is a diagram showing a skeleton structure having key points of a human body in an embodiment of the present disclosure.

The following detailed description of the embodiments of the present disclosure refers to the accompanying drawings. It should be understood that the detailed description and specific examples, while indicating the present disclosure, are given by way of illustration and explanation only, not limitation.

To make the objects, technical solutions and advantages of the embodiments of the present disclosure more clear, the technical solutions of the embodiments of the present disclosure will be clearly and completely described below with reference to the drawings of the embodiments of the present disclosure. It is to be understood that the described embodiments are only a few embodiments of the present disclosure, and not all embodiments. All other embodiments, which can be derived by a person skilled in the art from the described embodiments of the present disclosure without inventive step, are within the scope of protection of the present disclosure.

Unless otherwise defined, technical or scientific terms used in the embodiments of the present disclosure should have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Similarly, the word "include" or "comprise", or the like, means that the element or item preceding the word comprises the element or item listed after the word and its equivalent, but does not exclude other elements or items. The terms "connect" or "couple" and the like are not restricted to physical or mechanical connections, but may include electrical connections, whether direct or indirect. "Upper", "lower", "left", "right", and the like are used only to indicate relative positional relationships, and when the absolute position of the object being described is changed, the relative positional relationships may also be changed accordingly.

With the development of the Internet of Things and artificial intelligence technology, driven by the demand for consumer-level and enterprise-level applications in indoor environments, the importance of indoor location-based services in information systems is becoming increasingly prominent. As the core of indoor positioning and navigation services, real-time geographic coordinate calculation technology for indoor personnel has broad potential application value in large indoor public spaces such as supermarkets, exhibition halls, and transportation hubs.

The existing indoor positioning technology includes non-visual type and visual type indoor positioning methods, wherein the real-time geographic coordinate calculation technology for the non-visual type indoor personnel positioning includes various indoor positioning technologies such as an ultra wide band (UWB) positioning technology, a Bluetooth Beacon positioning technology based on RSSI (received signal strength indicator) signal field intensity indication, and an RFID (radio frequency identification) positioning technology, each of which involves various types of special sensors, and has high engineering cost, and needs complex operation and maintenance. The security monitoring camera is a universal sensor with the widest coverage, substantially realizes high coverage and even full coverage in most places, is easy to obtain and low in cost. Therefore, the system is expected to become a basic core technology for real-time geographic coordinate calculation for indoor personnel by detecting and analyzing a human body target through a computer vision technology in combination with the security monitoring camera.

The visual indoor personnel detection and positioning technology includes determining which camera monitoring area a person is in through a facial recognition technology, but the technology can only be accurate to a certain area and cannot calculate real-time geographic coordinates of the person. The visual indoor personnel detection and positioning technology also includes calculating the position of a human body target through a personnel detection technology, but the target detection box occupies a larger area of an image, so that higher precision is difficult to achieve.

In order to solve at least one of the above technical problems, an embodiment of the present disclosure provides a positioning method, which calculates accurate geographic coordinates of indoor personnel in real time based on a low-cost security monitoring camera.

FIG. 1a is a schematic flowchart showing a positioning method in an embodiment of the present disclosure, and FIG. 1b is a schematic diagram showing a positioning process for the method shown in FIG. 1a. As shown in FIG. 1a and FIG. 1b, the positioning method includes steps S1 to S4.

At step S1, acquiring an image to be processed, where the image to be processed includes a target object.

The image to be processed is acquired by the monitoring device.

At step S2, detecting a plurality of key points of the target object to determine first coordinates, in a camera coordinate system, of the plurality of key points of the target object.

At step S3, projecting the key points from the camera coordinate system to a geodetic coordinate system to obtain a mapping graph with each key point as a vertex.

At step S4, calculating a barycentric coordinate (i.e., a coordinate of a barycentre) of the mapping graph, and serving the barycentric coordinate as a geographical coordinate of the target object.

According to the positioning method in the embodiment of the present disclosure, the coordinate of the target object in the camera coordinate system are determined firstly through a key point detection technology; the coordinate of the target object is mapped from the camera coordinate system to the geodetic coordinate system; and the geographical coordinate of the target object is finally determined based on the coordinate conversion between the camera coordinate system and the geodetic coordinate system. Compared with the related art, firstly, the image to be processed is obtained through the monitoring device, and the difficulty and the cost of data obtaining can be reduced based on the high coverage rate of the monitoring device; secondly, the accuracy of the geographic coordinate can be improved by calculating the center of gravity of the polygonal projection of the key points of the human body on the geodetic plane.

It should be understood that C (x, y) in FIG. 1b represents the geographical coordinate of the target object.

FIG. 2 is a diagram showing a skeleton structure having key points of a human body in an embodiment of the present disclosure. In some embodiments, as shown in FIG. 2, the object includes a human body, and the key points include a head, a neck, a right shoulder, a right elbow, a right wrist, a right hand, a left shoulder, a left elbow, a left wrist, a left hand, a back, a waist, a right hip, a right knee, a right ankle, a left hip, a left knee, and a left ankle.

The step S2 in the method for determining the first coordinates of key points in the camera coordinate system, will be described in detail below with reference to a specific embodiment.

FIG. 3 is a schematic flowchart showing another positioning method in an embodiment of the present disclosure. In some embodiments, as shown in FIG. 3, the step S2 includes step S20.

At step S20, inputting the image to be processed into a pre-generated deep convolutional neural network to obtain the first coordinates, in the camera coordinate system, of the plurality of key points of the target object.

The deep convolutional neural network includes a pre-processing network and a dual-branch network. The dual-branch network includes a detection network and a regression network. Specifically, the whole deep convolutional neural network includes nine trainable layers, which include three convolutional layers for the pre-processing network, three fully-connected layers for the detection network, and three fully-connected layers for the regression network. The inputs of the detection network and the regression network are the output results of the pre-processing network, that is, the detection network and the regression network share the three convolutional layers described above.

The process for training the deep convolutional neural network will be illustrated in the following embodiments, and will not be described herein again.

Figure 4:
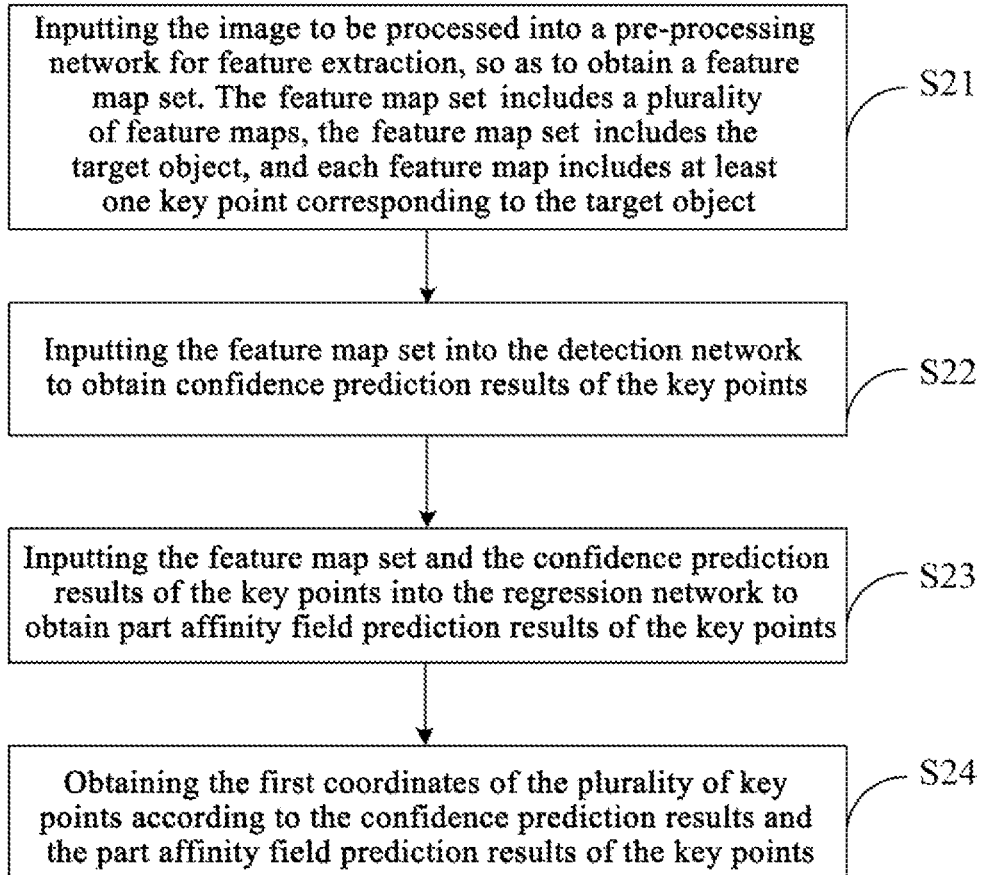
FIG. 4 is a detailed schematic flowchart of step S20.

FIG. 4 is a detailed schematic flowchart of step S20. In some embodiments, as shown in FIG. 4, step S20 includes steps S21 to S24:

At step S21, inputting the image to be processed into a pre-processing network for feature extraction, so as to obtain a feature map set. The feature map set includes a plurality of feature maps, the feature map set includes the target object, and each feature map includes at least one key point of the target object.

In one example, the feature maps in the feature map set may be feature maps formed from different body parts of a human, such as a head feature map, an upper limb feature map, a waist feature map, and a leg feature map. Each feature map includes multiple key points, and repeat key points exist in different feature maps. For example, the left hip key point and the right hip key point may be in both the waist feature map and the leg feature map.

And step S22, inputting the feature map set into the detection network to obtain confidence prediction results of the key points.

The confidence prediction result represents a predicted position of a key point. In the embodiment, the detection network predicts confidence coefficients on the feature map set of all the key points simultaneously, namely, multi-task predictions are performed simultaneously, so that the skeleton diagram of the whole body can be predicted simultaneously when the actual network is applied, and the prediction speed can be improved. Meanwhile, due to the adoption of multi-task training and prediction, when a certain key point is shielded, the prediction result won't be influenced. For example, when the torso of a person is shielded, the identification of the key points on the face and the hand won't be influenced. When the skeleton diagrams of a plurality of people are identified, the algorithm complexity can be greatly reduced, the calculation speed can be increased, and the calculation time can be decreased.

Specifically, step S22 includes: detecting the feature map set to determine initial coordinates of the key points in each feature map and confidence values corresponding to the initial coordinates; and determining at least one initial coordinate with the confidence value larger than a preset threshold value as a predicted coordinate of the key point.

For one of the key points, the key point may exist in different feature maps, and any one of the key points in each feature map may be predicted to obtain at least one predicted coordinate, therefore each key point may have multiple predicted coordinates which are obtained according to different feature maps.

At step S23, inputting the feature map set and the confidence prediction results of the key points into the regression network to obtain part affinity field prediction results of the key points.

The part affinity field prediction result represents a relationship between the predicted positions. Specifically, the confidence prediction result obtained by the detection network may be regarded as a set, which includes subsets corresponding to the feature maps, and each subset has a key point that repeat with that in one or more other subsets, so as to obtain a complete human skeleton diagram subsequently. For example, at least one key point in the head key point subset is coincided with a coordinate of at least one key point in the upper limb key point subset; alternatively at least one key point in the waist key point subset is coincided with a coordinate of at least one key point in the leg key point subset.

In an embodiment, the step S23 includes: determining a father key point corresponding to each key point according to a human skeleton structure diagram acquired in advance, wherein the father key point of the root key point is the root key point itself. For each feature map: pairwise matching at least one predicted coordinates respectively corresponding to each key point and a father key point corresponding to the key point, to determine an affinity field between the two matched predicted coordinates; and connecting the two predicted coordinates with the strongest affinity fields therebetween to obtain the body part connection (i.e., a connection between body parts) between each key point and the father key point corresponding to the key point.

It should be noted that the affinity field prediction by using the regression network is performed in units of each feature map, that is, the subset corresponding to each feature map includes the predicted results of the multiple key points in the feature map, and the predicted result of each key point includes at least one predicted coordinate.

At step S24, obtaining the first coordinates of the plurality of key points according to the confidence prediction results and the part affinity field prediction results of the key points.

Specifically, after local skeleton diagrams corresponding to each feature map are obtained according to the part affinity field prediction result, all the local skeleton diagrams are combined together according to the coordinates of the overlapping key points (namely, the key points with the same shared position), so that a whole body skeleton diagram may be obtained, namely the first coordinates of the plurality of key points may be obtained.

It should be noted that when the key points in the same position in different local skeleton diagrams have different predicted coordinates, the predicted coordinate with higher confidence is selected as the position of the key point.

The process for training the deep convolutional neural network will be described in detail with reference to specific embodiments.

FIG. 5 is a schematic flowchart showing a method for training a deep convolutional neural network in an embodiment of the present disclosure. As shown in FIG. 5, the training method includes steps S01 to S04:

At step S01, calculating a confidence loss function after the confidence prediction result is obtained by the detection network; and determining whether a preset threshold of the confidence loss function is met.

The confidence loss function Ed may be defined as a cross entropy of $h_{i,l}$ and $\hat{h}_{i,l}$, which may be represented by Formula 5:

$$E_d(\hat{h}_{i,l}, h_{i,l}) = -h_{i,l}\log(\hat{h}_{i,l}) - (1 - h_{i,l})\log(1 - \hat{h}_{i,l}) \qquad \text{Formula 5}$$

wherein $\hat{h}_{i,l}$ is a predicted coordinate of the $i^{th}$ key point in the feature map l, and a value of $h_{i,l}$ is 0 or 1. Specifically, when the $i^{th}$ key point in the feature map l is detected by the detection network, that is, when the $i^{th}$ key point is not shielded, $h_{i,l}$ has a value of 1, otherwise 0.

It should be noted that in the embodiment, the detection network is used for performing prediction on the feature map set of all key points simultaneously, that is, multi-task predictions are performed simultaneously, therefore even if a certain key point is shielded, the key point may be predicted according to other key points.

At step S02, calculating the loss function of the part affinity field after the part affinity field prediction result is obtained through the regression network; and determining whether a preset threshold of the loss function of the part affinity field is met.

The loss function $E_r$ of the local affinity vector field may be calculated by Formula 6:

$$E_r(R_i, \hat{R}_i) = |R_i - \hat{R}_i|_2^2 \qquad \text{Formula 6}$$

$R_i$ and $\hat{R}_i$ is a true coordinate and a predicted coordinate of the $i^{th}$ key point, respectively.

At step S03, calculating the sum of the confidence loss function and the loss function of the part affinity field; and determining whether a preset threshold of the target loss function is met.

At step S04, when the confidence loss function, the loss function of the part affinity field, and the sum of the confidence loss function and the loss function of the part affinity field each meet a preset threshold, the training of the deep convolutional neural network is finished.

It should be noted that, the preset thresholds for the confidence loss function, the loss function of the part affinity field, and target loss function may be adjusted by a person skilled in the art according to training requirements and not limited by the embodiment of the present disclosure.

Step S3 in the method for determining the first coordinates of the key points in the camera coordinate system will be described in detail below with reference to a specific embodiment.

In some embodiments, step S3 includes steps S31 and S32.

At step S31, mapping the first coordinates of the key points corresponding to the target object into second coordinates in the geodetic coordinate system according to a conversion algorithm acquired in advance between the camera coordinate system and the geodetic coordinate system.

At step S32, a mapping graph corresponding to the target object is formed with each second coordinate as a vertex.

Specifically, the mapping graph is a polygon having N sides (i.e., N-gon), and N is an integer greater than 3. In an embodiment, step S32 includes:

Dividing the mapping graph into (N−2) triangles, wherein the (N−2) triangles are triangles formed by a preset vertex and (N−2) sides which are not adjacent to the preset vertex. For example, one vertex Ai of the N-gon is taken as a preset vertex, and other vertices not adjacent to Ai are connected to Ai to form (N−2) triangles.

Calculating a barycentric coordinate $G_i$ $(x_i, y_i)$ and an area $\sigma_i$ for each triangle according to the second coordinate of each key point corresponding to the target object. The barycentric coordinate $G_i$ may be calculated through Formula 1, and the area $\sigma_i$ may be calculated through Formula 2.

$$x_i = \frac{(x_1 + x_2 + x_3)}{3}, \; y_i = \frac{(y_1 + y_2 + y_3)}{3} \qquad \text{Formula 1}$$

$$\sigma_i = \frac{(x_2 - x_1)*(y_3 - y_1) - (x_3 - x_1)*(y_2 - y_1)}{2} \qquad \text{Formula 2}$$

Wherein $x_1$, $x_2$ and $x_3$ are respectively the horizontal coordinates of three vertexes of the triangle, and $y_1$, $y_2$ and $y_3$ are respectively the vertical coordinates of the three vertexes of the triangle.

The barycentric coordinate $G_g$ $(x_g, y_g)$ of the mapping graph is determined from the barycentric coordinate $G_i$ $(x_i, y_i)$ and the area $\sigma_i$ of each triangle, and the barycentric coordinate serves as the geographical coordinate of the target object, which may be calculated by Formula 3.

$$x_g = \frac{\sum_{i=1}^{N-2} x_i \sigma_i}{\sum_{i=1}^{N-2} \sigma_i}, \; y_g = \frac{\sum_{i=1}^{N-2} y_i \sigma_i}{\sum_{i=1}^{N-2} \sigma_i} \qquad \text{Formula 3}$$

In some embodiments, as shown in FIG. 3, the method further includes step S5 and step S6:

At step S5, calculating a homography matrix between the geographic coordinate and the image coordinate of the reference point, according to the geographic coordinate of the preset reference point in the image to be processed and the image coordinate of the preset reference point in the image to be processed.

In one example, the image coordinate of the preset reference point in the image to be processed may be represented as (u, v), the actual geographic coordinates thereof may be represented as (X, Y), and the homography matrix H may be calculated by Formula 4:

$$\begin{pmatrix} u \\ v \\ 1 \end{pmatrix} = H \begin{pmatrix} X \\ Y \\ 1 \end{pmatrix} \qquad \text{Formula 4}$$

It should be noted that the homography matrix H is a 3×3 vector, which is used for mapping reference points in different coordinate systems and performing the linear transformation on three-dimensional homogeneous vector, therefore in the calculation process, the coordinates of the reference points in the geodetic coordinate system and the image coordinate system need to be converted into three-dimensional coordinates, that is, the Z-axis coordinate of the coordinate (u, v) in the image coordinate system and the Z-axis coordinate of the coordinate (X, Y) in the geodetic coordinate system are each assigned with a value of 1.

At step S6, determining the image coordinate of the target object in the image to be processed according to the homography matrix.

The conversion between the image coordinate system and the geodetic coordinate system may be realized through the establishment of the homography matrix, so that the geographic position of the target object can be directly obtained from the image, and the positioning efficiency can be improved.

Based on the same inventive concept, an embodiment of the present disclosure provides a positioning device.

FIG. 6 is a schematic diagram showing a structure of a positioning device in an embodiment of the present disclosure. As shown in FIG. 6, the positioning device includes an acquisition module 61, a detection module 62, a processing module 63, and a calculation module 64.

The acquisition module 61 is configured to acquire an image to be processed, wherein the image to be processed includes a target object.

The detection module 62 is configured to detect a plurality of key points in the target object and determine first coordinates of the plurality of key points of the target object in a camera coordinate system.

The processing module 63 is configured to project each key point in the camera coordinate system to a geodetic coordinate system to obtain a mapping graph with each key point as a vertex;

The calculation module 64 is configured to calculate a barycentric coordinate of the mapping graph, and serve the barycentric coordinate as a geographic coordinate of the target object.

The principle of the problems solved by the positioning device in the embodiments of the present disclosure is similar to that of the problems solved by the positioning method in the embodiments of the present disclosure described above, and is not repeated herein.

Figure 7:
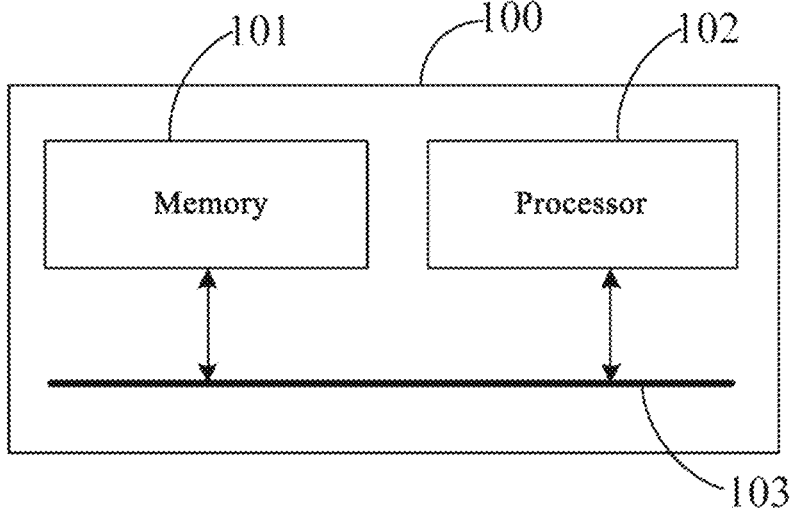
FIG. 7 is a schematic diagram showing a structure of a positioning apparatus in an embodiment of the present disclosure.

FIG. 7 is a schematic diagram showing a structure of a positioning apparatus in an embodiment of the present disclosure. As shown in FIG. 7, the positioning apparatus 100 includes: a memory 101, a processor 102 and a bus 103, the memory 101 having stored thereon a computer program, wherein the computer program, when executed by the processor 102, implements the above-mentioned positioning method, for example implementing steps S1 to S4 in FIG. 1a. The processor 102 communicates with the memory 101 via the bus 103, so that the processor 102 executes the execution instructions mentioned in the above method embodiments.

Furthermore, the positioning apparatus may be integrated into a mobile client, and when the positioning apparatus is applied to the client, the coordinates can be adaptively switched according to the resolution of the camera image and the resolution of the client image according to the requirement of the client on the resolution of the directly viewed image. Before the image coordinate of the target object is converted into the geographic coordinate, the resolution of the camera image is converted into the resolution in the client image; after the geographic coordinate of the target object is converted to image coordinate, the resolution in the client image is converted to the resolution of the camera image.

The positioning apparatus 100 may be a computing device such as a desktop computer, a notebook, a palm top computer, and a cloud server. Positioning apparatus 100 may include, but is not limited to, a processor 102 and a memory 101. Those skilled in the art will appreciate that FIG. 7 is merely an example of the positioning apparatus 100, and does not constitute a limitation on the positioning apparatus 100, and may include more or fewer components than those shown, or some components or different components may be combined, for example, the positioning apparatus 100 may also include input-output devices, network access devices.

The Processor 102 may be a Central Processing Unit (CPU), other general purpose Processor, a Digital Signal Processor (DSP), an Application Specific Integrated Circuit (ASIC), a Field-Programmable Gate Array (FPGA) or other Programmable logic device, discrete Gate or transistor logic, discrete hardware components, etc. The general purpose processor 102 may be a microprocessor or the processor may be any conventional processor or the like.

The memory 101 may be an internal storage unit of the positioning apparatus 100, such as a hard disk or a memory of the positioning apparatus 100. The memory 101 may also be an external storage device of the positioning apparatus 100, such as a plug-in hard disk, a Smart Media Card (SMC), a Secure Digital (SD) Card, a Flash memory Card (Flash Card), or the like, provided on the positioning apparatus 100. Further, the memory 101 may also include both an internal storage unit and an external storage device of the positioning apparatus 100. The memory 101 is used for storing the computer programs and other programs and data required by the terminal device. The memory 101 may also be used to temporarily store data that has been output or is to be output.

It should be clear to those skilled in the art that, for convenience and simplicity of description, the foregoing division of the functional units and modules is only used for illustration, and in practical applications, the above function distribution may be performed by different functional units and modules as needed, that is, the internal structure of the apparatus may be include different functional units or modules to perform all or part of the above described functions. Each functional unit and module in the embodiments may be integrated in one processing unit, or each unit may exist alone physically, or two or more units are integrated in one unit, and the integrated unit may be implemented in a form of hardware, or in a form of software functional unit. In addition, specific names of the functional units and modules are only used for distinguishing one functional unit from another, and are not used for limiting the protection scope of the present application. For the specific operation processes of the units and modules in the system, reference may be made to the corresponding processes in the foregoing method embodiments, which are not described herein again.

Figure 8:
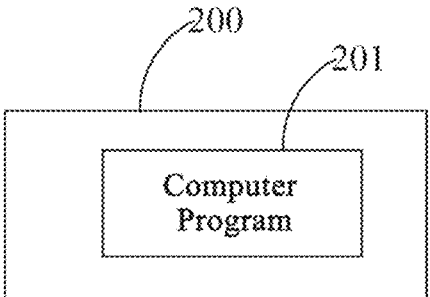
FIG. 8 is a schematic structural diagram of a computer non-transitory readable storage medium in an embodiment of the present disclosure.

FIG. 8 is a schematic structural diagram of a computer non-transitory readable storage medium in an embodiment of the present disclosure. As shown in FIG. 8, a computer program 201 is stored on a computer readable storage medium 200, where the computer program 201 is executed by a processor to implement the above positioning method, for example, implement steps S1 to S4 in FIG. 1a. Computer-readable storage media 200 includes, but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which may be used for storing the desired information and be accessible by a computer. In addition, it is known to those skilled in the art that communication media typically includes computer readable instructions, data structures, program modules or other data in a modulated data signal such as a carrier wave or other transport mechanism and includes any information delivery media as is well.

It will be understood that the above embodiments are merely exemplary embodiments employed to illustrate the principles of the present disclosure, and the present disclosure is not limited thereto. It will be apparent to those skilled in the art that various changes and modifications may be made therein without departing from the spirit and essence of the present disclosure, and these changes and modifications are to be considered within the scope of the present disclosure.

What is claimed is:

1. A positioning method, comprising:

acquiring an image to be processed, wherein the image to be processed comprises a target object;

detecting a plurality of key points of the target object to determine first coordinates of the plurality of key points of the target object in a camera coordinate system;

projecting the plurality of key points from the camera coordinate system to a geodetic coordinate system to obtain a mapping graph with each of the plurality of key points as a vertex; and calculating a barycentric coordinate of the mapping graph, and taking the barycentric coordinate as a geographic coordinate of the target object.

2. The positioning method of claim 1, wherein detecting the plurality of key points of the target object to determine the first coordinates of the plurality of key points of the target object in the camera coordinate system, comprises:

inputting the image to be processed into a pre-trained deep convolution neural network to obtain the first coordinates, in the camera coordinate system, of the plurality of key points corresponding to the target object.

3. The positioning method of claim 2, wherein the deep convolutional neural network comprises a pre-processing network and a dual-branch network, and the dual-branch network comprises a detection network and a regression network, inputting the image to be processed into the pre-trained deep convolution neural network to obtain the first coordinates, in the camera coordinate system, of the plurality of key points corresponding to the target object, comprises:

inputting the image to be processed into the pre-processing network for feature extraction to obtain a feature map set, wherein the feature map set comprises a plurality of feature maps, the feature map set comprises the target object, and each of the plurality of feature maps comprises at least one of the plurality of key points;

inputting the feature map set into the detection network to obtain confidence prediction results of the key points;

inputting the feature map set and the confidence prediction results of the key points into the regression network to obtain part affinity field prediction results of the key points; and obtaining the first coordinates of the plurality of key points according to the confidence prediction results and the part affinity field prediction results of the key points;

wherein the confidence prediction result represents a predicted position of the key point, and the part affinity field prediction result represents an association relation between the predicted positions.

4. The positioning method of claim 3, wherein inputting the feature map set into the detection network to obtain the confidence prediction results of the key points, comprises:

detecting the feature map set to determine initial coordinates of the key point in each feature map and a confidence value corresponding to each of the initial coordinates; and determining at least one of the initial coordinates with the confidence value larger than a preset threshold value as a predicted coordinate of the key point, wherein the confidence prediction result of the key point comprises at least one predicted coordinate.

5. The positioning method of claim 4, wherein inputting the feature map set and the confidence prediction results of the key points into the regression network to obtain the part affinity field prediction results of the key points, comprises:

determining a father key point corresponding to each key point according to a human skeleton structure diagram acquired in advance, wherein the father key point of a root key point is the root key point itself;

for each of the plurality of feature maps:

pairwise matching at least one predicted coordinate corresponding to each key point with at least one predicted coordinate corresponding to a father key point corresponding to the key point, to determine an affinity field between the two matched predicted coordinates; and connecting the two predicted coordinates with the strongest affinity fields therebetween to obtain a body part connection between the key point and the father key point corresponding to the key point; and forming a local skeleton diagram corresponding to the feature map according to all body part connections in the feature map.

6. The positioning method of claim 5, wherein obtaining the first coordinates of the plurality of key points according to the confidence prediction results and the part affinity field prediction results of the key points, comprises:

combining and splicing the local skeleton diagrams corresponding to the feature maps according to the key points at a same position in different local skeleton diagrams, to determine a complete skeleton diagram of the target object; selecting the predicted coordinate with a higher confidence as a position of the key point in response to that the key point at the same position in different local skeleton diagrams has different predicted coordinates; and obtaining the first coordinates of the plurality of key points according to the complete skeleton diagram.

7. The positioning method of claim 3, wherein prior to inputting the image to be processed into the pre-trained deep convolution neural network, the method further comprises:

calculating a confidence loss function after the confidence prediction result is obtained by the detection network; and determining whether a preset threshold value of the confidence loss function is met;

calculating a loss function of a part affinity field after the part affinity field prediction result is obtained by the regression network; and determining whether a preset threshold value of the loss function of the part affinity field is met;

calculating a sum of the confidence loss function and the loss function of the part affinity field to determine whether a preset threshold value of a target loss function is met; and finishing training of the deep convolutional neural net-work, in response to that the confidence loss function, the loss function of the part affinity field, and the sum of the confidence loss function and the loss function of the part affinity field all meet a preset threshold.

8. The positioning method of claim 7, wherein the con-fidence loss function is calculated by the following formula:

$$E_d(\hat{h}_{i,l}, h_{i,l}) = -h_{i,l} \log(\hat{h}_{i,l}) - (1 - h_{i,l}) \log(1 - \hat{h}_{i,l})$$

wherein $\hat{h}_{i,l}$ is a predicted coordinate of the $i^{th}$ key point in the feature map l, and a value of $h_{i,l}$ is 0 or 1; in response to that the $i^{th}$ key point in the feature map l is not shielded, $h_{i,l}$ has a value of 1, otherwise 0.

9. The positioning method of claim 7, wherein the loss function of the part affinity field is calculated by the fol-lowing formula:

$$E_r(R_i, \hat{R}_i) = |R_i - \hat{R}_i|_2^2$$

wherein Ri and $\hat{R}_i$ is a true coordinate and a predicted coordinate of the $i^{th}$ key point, respectively, and the true coordinate is pre-obtained sample data.

10. The positioning method of claim 1, wherein the target object comprises a human body, the plurality of key points comprise a head, a neck, a right shoulder, a right elbow, a right wrist, a right hand, a left shoulder, a left elbow, a left wrist, a left hand, a back, a waist, a right hip, a right knee, a right ankle, a left hip, a left knee, and a left ankle.

11. The positioning method of claim 1, wherein projecting the plurality of key points from the camera coordinate system to the geodetic coordinate system to obtain the mapping graph with each of the plurality of key points as the vertex, comprises:

mapping the first coordinates of the key points corre-sponding to the target object into second coordinates in the geodetic coordinate system, according to a conver-sion algorithm acquired in advance between the camera coordinate system and the geodetic coordinate system; and forming the mapping graph corresponding to the target object by taking each of the second coordinates as a vertex.

12. The positioning method of claim 11, wherein the mapping graph is a polygon having N sides, with N being an integer greater than 3;

calculating the barycentric coordinate of the mapping graph, and taking the barycentric coordinate as the geographic coordinate of the target object, comprises:

dividing the mapping graph into (N−2) triangles, wherein the (N−2) triangles are triangles formed by a preset vertex and (N−2) sides not adjacent to the preset vertex;

calculating a barycentric coordinate and an area of each of the triangles according to the second coordinates of the key points corresponding to the target object; and determining the barycentric coordinate of the mapping graph according to the barycentric coordinate and the area of each of the triangles, and taking the barycentric coordinate as the geographic coordinate of the target object.

13. The positioning method of claim 12, wherein the barycentric coordinate of the map pattern is calculated by the following formula:

$$x_g = \frac{\sum_{i=1}^{N-2} x_i \sigma_i}{\sum_{i=1}^{N-2} \sigma_i}, \ y_g = \frac{\sum_{i=1}^{N-2} y_i \sigma_i}{\sum_{i=1}^{N-2} \sigma_i}$$

wherein $x_i$ and $y_i$ respectively represent horizontal and vertical coordinates of the barycentric coordinate of the $i^{th}$ triangle, and $\sigma_i$ represents an area of the $i^{th}$ triangle.

14. The positioning method of claim 1, further compris-ing:

calculating a homography matrix between a geographic coordinate and an image coordinate of a reference point, according to the geographic coordinate of the preset reference point in the image to be processed and the image coordinate of the preset reference point in the image to be processed; and determining an image coordinate of the target object in the image to be processed according to the homography matrix.

15. The positioning method of claim 14, wherein the homography matrix between the geographic coordinate and the image coordinate of the reference point is calculated by the following formula:

$$\begin{pmatrix} u \\ v \\ 1 \end{pmatrix} = H \begin{pmatrix} X \\ Y \\ 1 \end{pmatrix}$$

where H denotes the homography matrix, u and v denote horizontal and vertical coordinates of the image coor-dinate, respectively, and X and Y denote horizontal and vertical coordinates of the geographical coordinate, respectively.

16. A positioning apparatus, comprising a processor, a memory and a bus, wherein the processor communicates with the memory through the bus, the memory storing machine-readable instructions which is configured to, when being run by the processor, cause the processor to perform the steps of the positioning method of claim 1.

17. A computer-non-transitory readable storage medium, storing a computer program which is configured to, when being run by the processor, perform the steps of the posi-tioning method of claim 1.

18. A positioning device, comprising:

an acquisition module configured to acquire an image to be processed, and the image to be processed compris-ing a target object;

a detection module configured to detect a plurality of key points of the target object to determine first coordinates, in a camera coordinate system, of the plurality of key points of the target object;

a processing module configured to project the plurality of key points in the camera coordinate system to a geo-detic coordinate system to obtain a mapping graph with each of the key points as a vertex; and a calculation module configured to calculate a barycentric coordinate of the mapping graph, and take the bary-centric coordinate as a geographic coordinate of the target object.

* * * * *